May 14, 1940.   J. G. BLUNT   2,200,833
ARTICULATED LOCOMOTIVE
Filed April 14, 1939   7 Sheets-Sheet 1
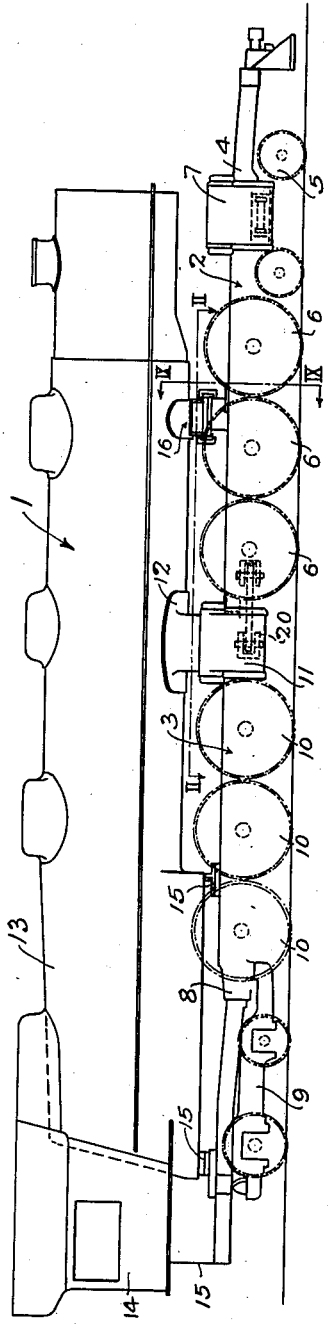
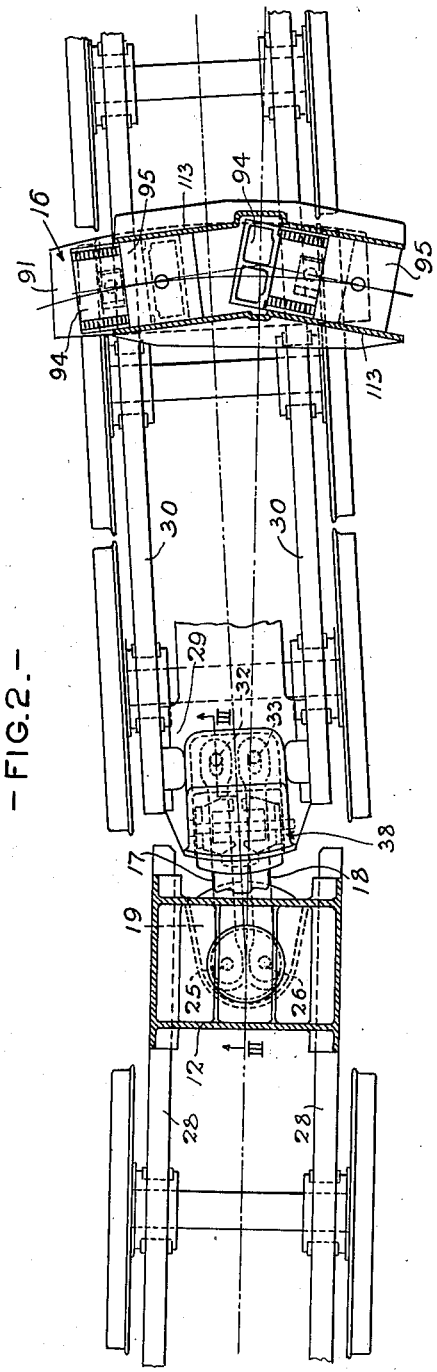
INVENTOR
James G. Blunt
BY
ATTORNEY

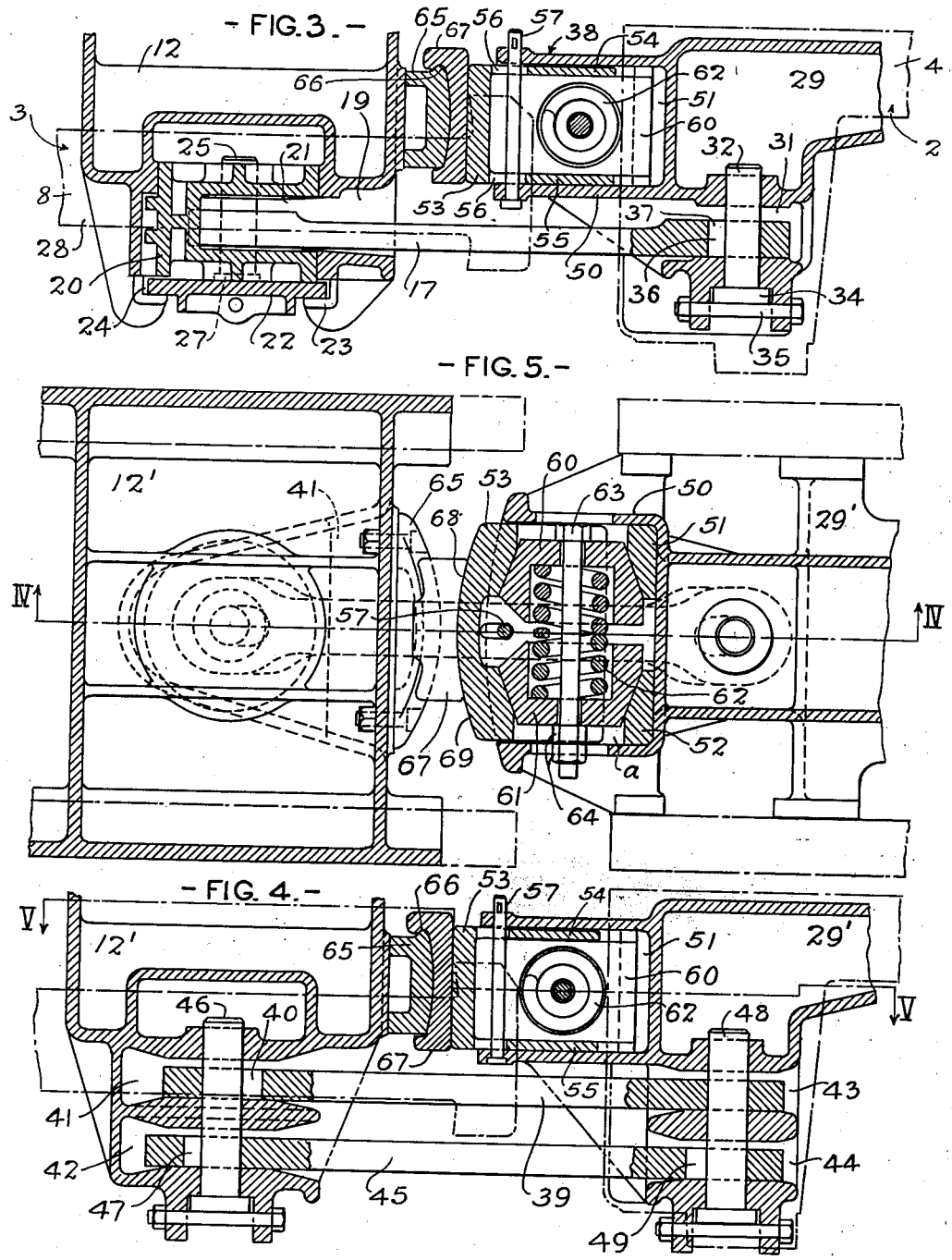

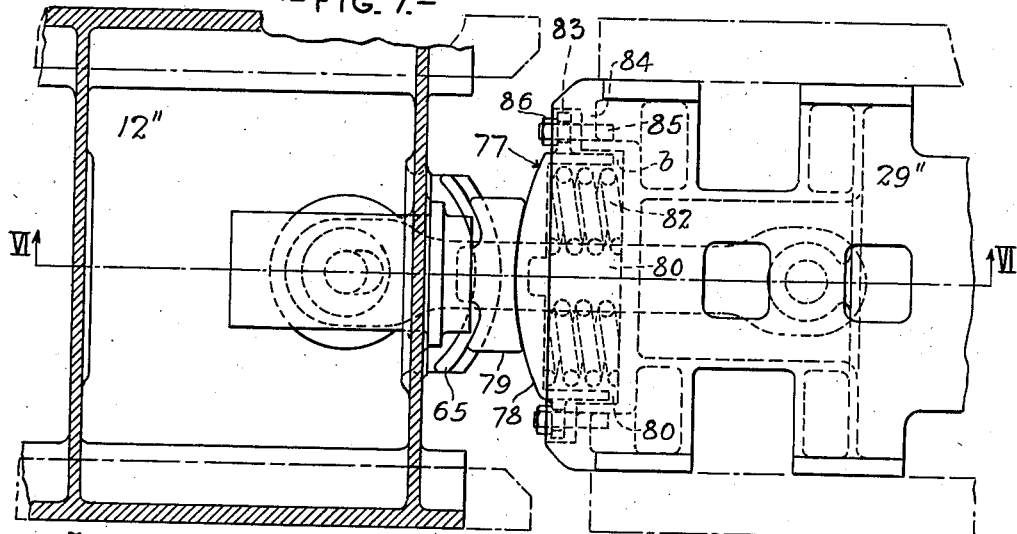
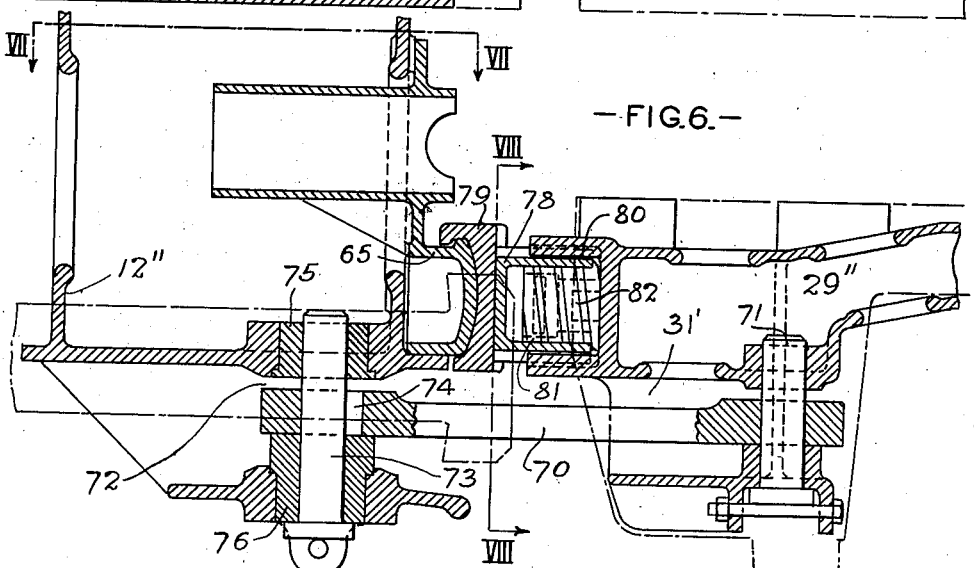
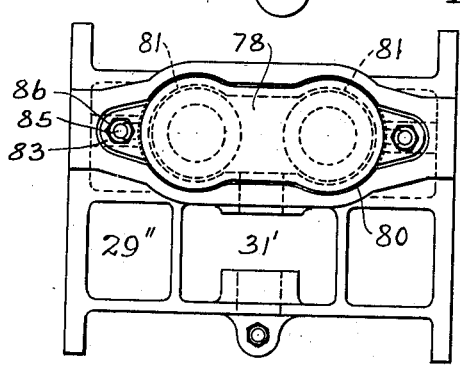

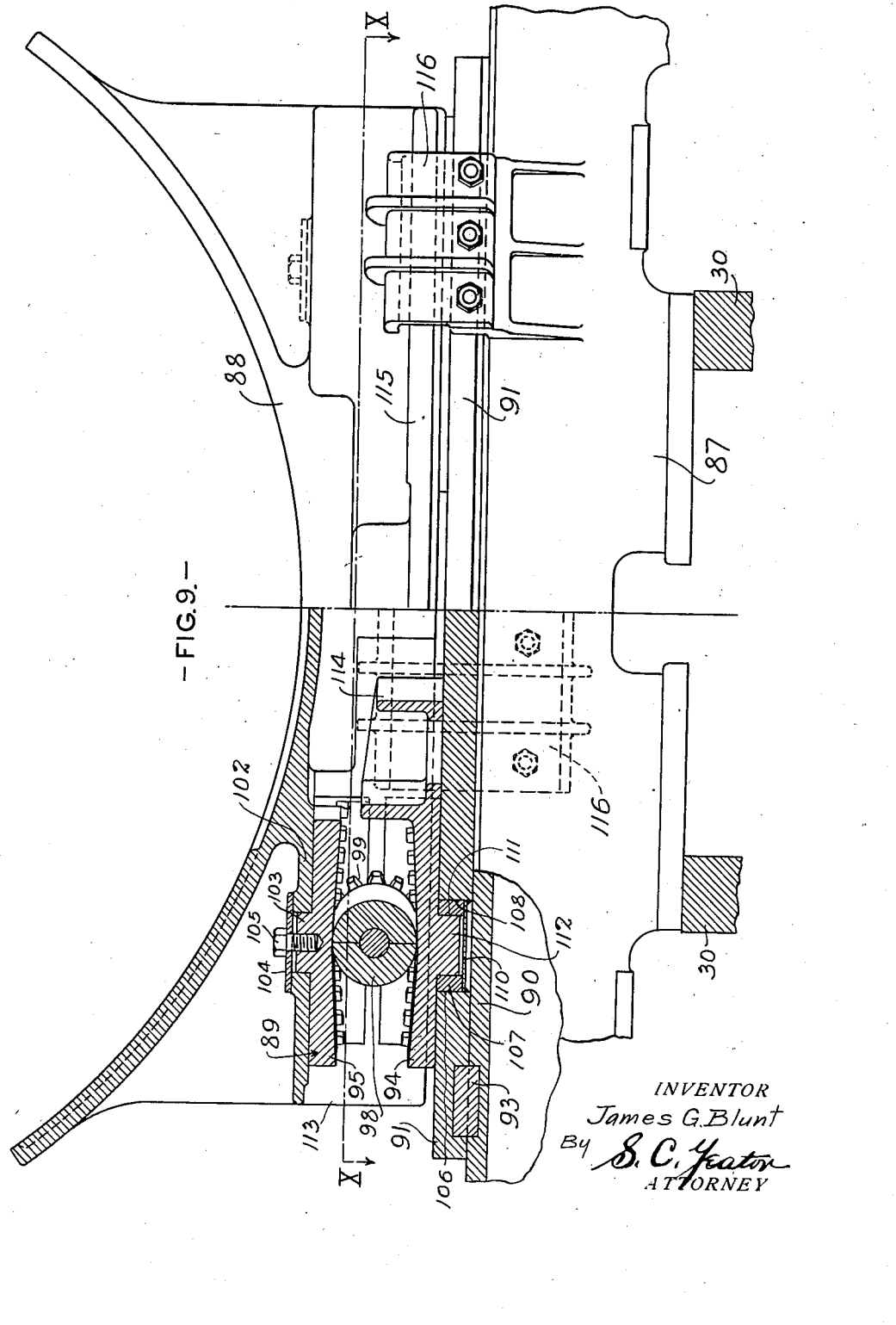

May 14, 1940.   J. G. BLUNT   2,200,833
ARTICULATED LOCOMOTIVE
Filed April 14, 1939   7 Sheets-Sheet 5
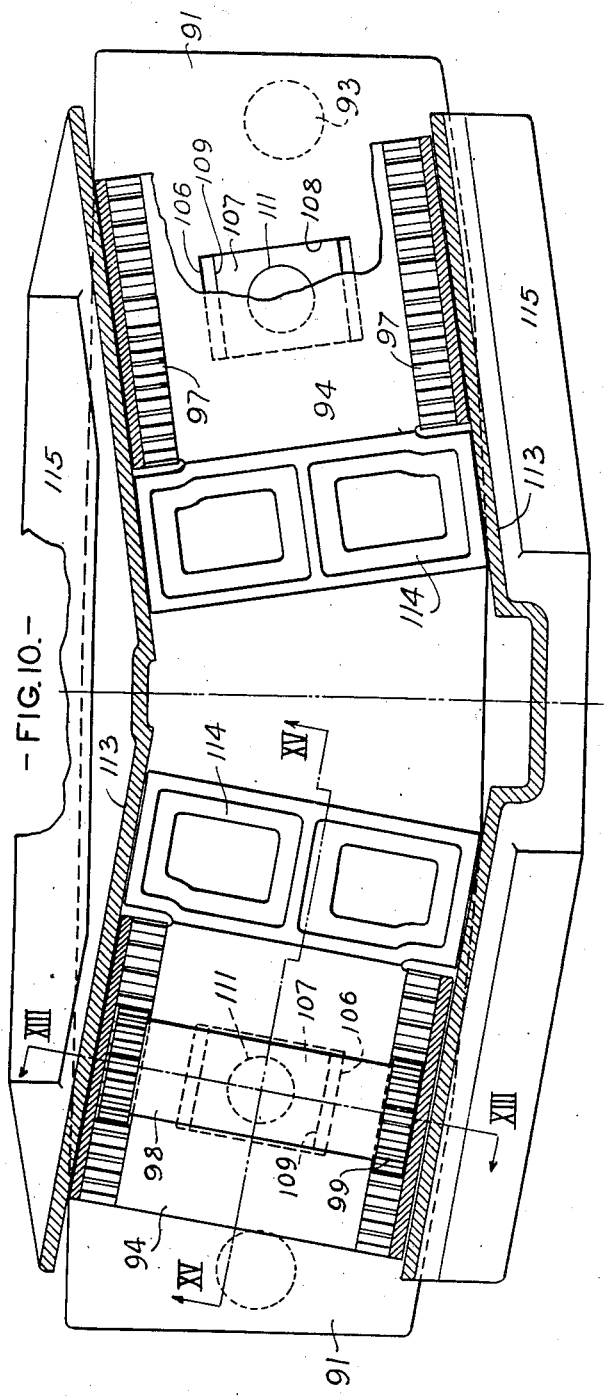
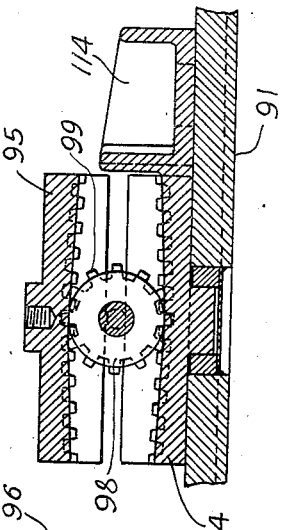
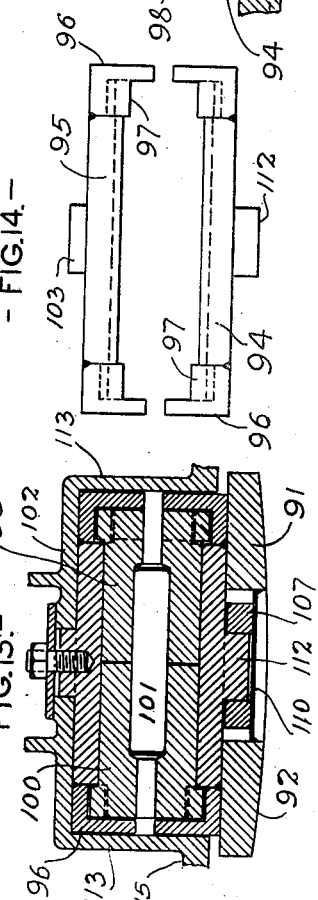
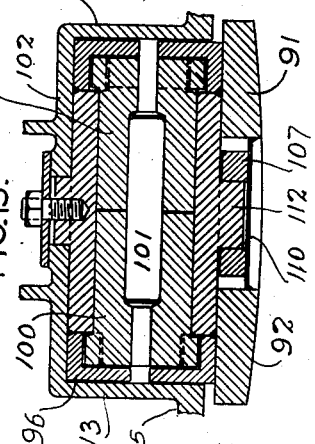
INVENTOR
James G. Blunt
By S. C. Yeaton
ATTORNEY

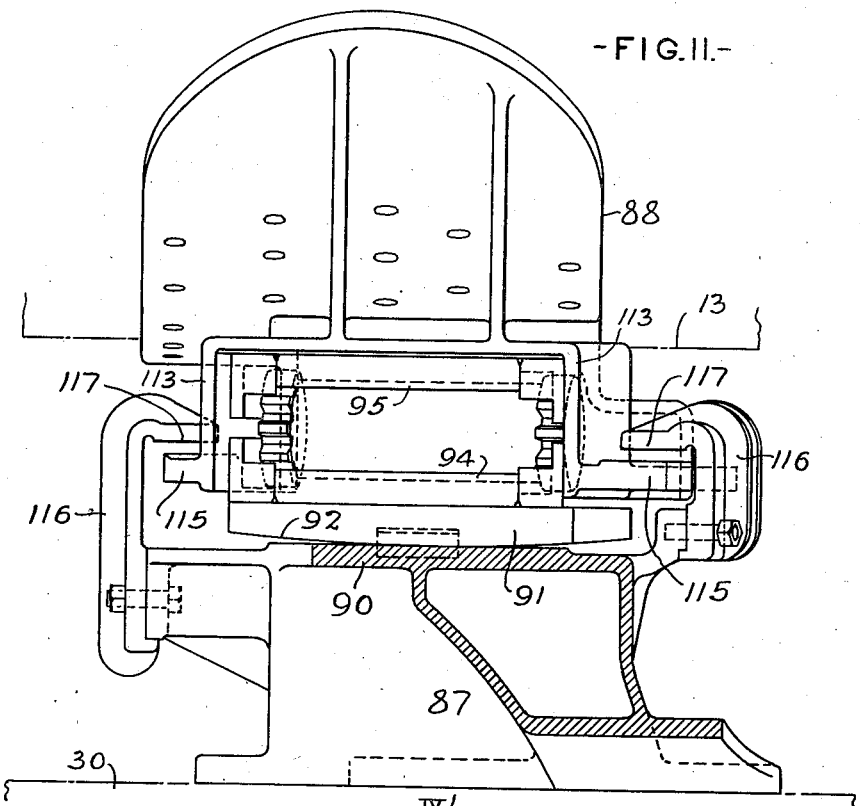
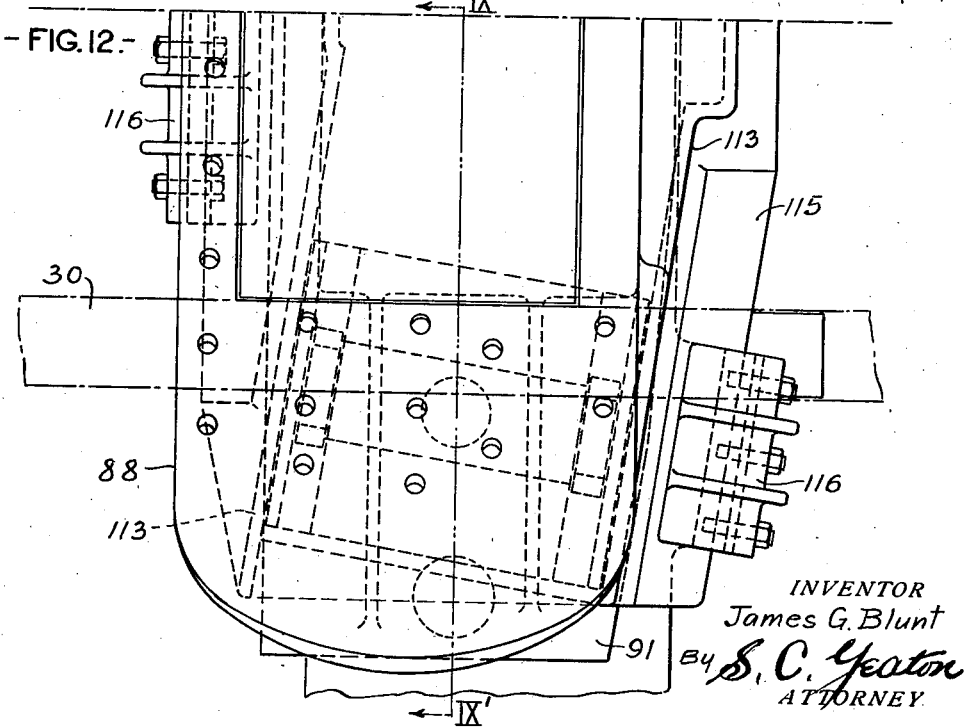

May 14, 1940.   J. G. BLUNT   2,200,833
ARTICULATED LOCOMOTIVE
Filed April 14, 1939   7 Sheets-Sheet 7
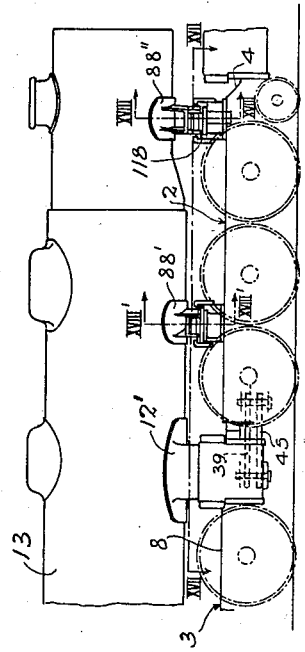
- FIG.16 -
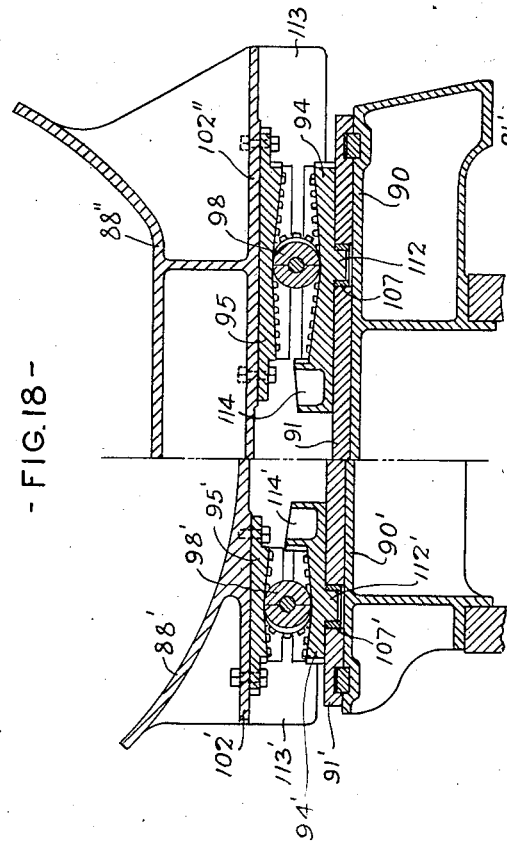
- FIG.18 -
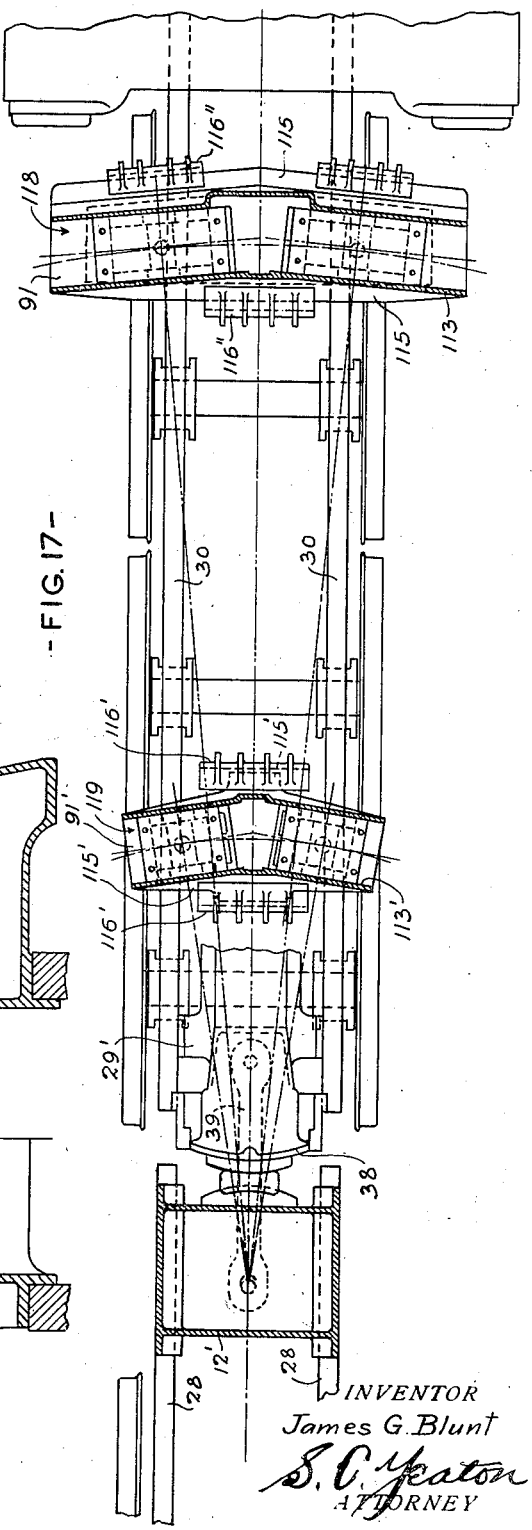
- FIG.17 -
INVENTOR
James G. Blunt
S. C. Yeaton
ATTORNEY Patented May 14, 1940

2,200,833

UNITED STATES PATENT OFFICE 2,200,833

ARTICULATED LOCOMOTIVE

James G. Blunt, Schenectady, N. Y., assignor to American Locomotive Company, New York, N. Y., a corporation of New York Application April 14, 1939, Serial No. 267,775

3 Claims. (Cl. 105—175)

This invention relates to articulated locomotives.

An object of this invention is to devise means for enabling the wheel flanges to control the lateral movements of the articulated units of the locomotive leaving the articulated link connection free from participating in such control, such participation being a function of the present day articulated link, much to the detriment of the link.

A further object is to devise, in an articulated locomotive, in combination with the improved characteristics aforesaid, an articulated link connection adapted to act as a tension connection only.

A further object is to provide, in a locomotive as aforedescribed, buffing means to absorb all buffing and compressive stresses, thus relieving the link connection of these stresses.

A further object is to devise, in a locomotive as aforedescribed, the articulated link connection and the buffing means so as to prevent, during normal operation of the locomotive, any lost motion tending to causing pounding and also to detrimentally affect the valve movements during such operation.

A further object, in a locomotive of the above characteristics, is directed to eliminate the conventional lateral motion device, which involves flat frictional surface load-carrying movements which at best offer an indefinite amount of lateral resistance, and which has no positive centering effect, and to devise, as a substitute therefor, a device having a definite lateral motion resistance and a positive centering effect.

A further object is to devise the lateral motion resistance and centering device aforementioned with compensatory means whereby longitudinal movement of the front unit relative to the device during pushing, buffing and compressive stresses will not affect the normal operation of the device.

A further object is directed to eliminate binding effects caused by the controlling action of the conventional articulated link, and to devise, as a substitute therefor, one or more articulated links having free flexible movements at their pivotal connections with the respective units of the articulated locomotive, tending to reduce slippage, maintain more uniform weight distribution, provide maximum safety in the articulated connection, and also to allow the two units, at their adjacent ends, to move each laterally independently of the other.

A further object is to free the frame structure of the front unit and the articulated link from the detrimental effects of the enormous overhang of the boiler supported by the front unit so prevalent in conventional types of articulated locomotives.

A further object is to provide, in a locomotive of the aforementioned characteristics, but in a modified form of the invention, means for preventing the frame of the front unit from oscillating or tilting in a vertical plane longitudinally of the locomotive relative to the boiler.

A further object is to provide, in a locomotive of the above just mentioned characteristics, means yieldingly resisting bodily lateral movement of the frame of the front unit, or lateral movement of any part thereof relative to the boiler, and to urge the return of the frame, after any of such lateral movements, to central position.

Referring to the drawings forming part of this application, Figure 1 is a diagrammatic side elevation of a 4—6—6—4 type of articulated locomotive involving the present invention; Fig. 2 is an enlarged section, taken on the line II—II of Fig. 1, showing a portion of each power unit of the locomotive of Fig. 1, illustrating particularly means for connecting the power units and a part of the lateral motion resistance and centering device, the locomotive being shown as entering a curve. In these views twin drawbars are employed for connecting the units. Fig. 3 is an enlarged section taken on the line III—III of Fig. 2, shown partly in dot and dash lines; Fig. 4 is a view similar to Fig. 3, taken on the line IV—IV of Fig. 5, showing a modification, a single drawbar and a safety bar being employed for connecting the units; Fig. 5 is a section on the line V—V of Fig. 4; Fig. 6 is a view similar to Fig. 3, on the line VI—VI of Fig. 7, partly in dot and dash lines, showing a further modification (here a single drawbar is employed and a different type of buffing device); Fig. 7, at the right, is a plan view of the portion at the right of Fig. 6, and at the left, is a section on the line VII—VII of Fig. 6; Fig. 8 is an end view of the portion at the right in Fig. 6, viewed from the line VIII—VIII of Fig. 6; Figs. 9 to 15 are views showing the lateral motion resistance and centering device employed in the present invention, Fig. 9, at the right, being an enlarged fragmental front end view of the lateral motion resistance and centering device, viewed from the line IX—IX of Fig. 1, and at the left, a fragmental section on the line IX'—IX' of Fig. 12; Fig. 10, a section on the line X—X of Fig. 9, parts being shown in full, parts being removed, and parts being broken away; Fig. 11, a side view, partly in section, of the portion of the locomotive shown in Fig. 9, a portion of the boiler being indicated in dot and dash lines; Fig. 12, a plan view of the part of the locomotive shown in Fig. 11, parts being shown in dot and dash lines; Fig. 13, a fragmental section on the line XIII—XIII of Fig. 10; Fig. 14, an end view of the roller seats and racks shown in Fig. 13; Fig. 15, a fragmental section on the line XV—XV of Fig. 10; and Figs. 16 to 18 show a modification of the invention, Fig. 16 being a fragmental diagrammatic side elevation of a locomotive showing the modification, Fig. 17 being an enlarged section, taken on the line XVII—XVII of Fig. 16, and Fig. 18 being, at the right, an enlarged section on the line XVIII—XVIII of Fig. 16, and, at the left, an enlarged section on the line XVIII'—XVIII' of Fig. 16.

The present invention is directed generally to articulated locomotives but perhaps has its best application to locomotives where two power units are articulated together, as for instance the Mallet type of locomotive, and accordingly the invention is illustrated, and will be described, in connection with such a locomotive. It will be understood however that the invention is intended to cover articulated locomotives generally regardless of the number of units and regardless of which of the units are power units.

Locomotives of the type illustrated have their power units connected together by an articulated link of peculiar characteristics. Such a locomotive, with the commonly employed articulated link, is shown in Patent No. 1,708,254, granted to me April 9, 1929. It will be noted that the conventional articulated link there shown is pivotally connected to the front unit for vertical swinging movement only by mounting the link at its forward end upon a relatively long horizontal pin or shaft secured in the framework of the front unit. The link is correspondingly very wide at its forward end where it is mounted upon the pin and allows for no lateral angular or swinging movement of the link relative to the front unit. This type link is connected to the rear unit usually by a universal joint. Such a link connection is undesirable for many reasons, several of which have been mentioned in reciting the foregoing objects of the invention.

It should be remarked that the vertical axis of the universal joint lies in the longitudinal central plane of each of the units regardless of the lateral angularity between the units. In this respect the conventional link acts as if it were a rigid extension of the front unit during relative lateral movements of the units, i. e., as if the two units were pivoted together at the universal joint. Therefore all lateral shocks received at the adjacent ends of the two units are transmitted from the shock-receiving unit to the other unit. Furthermore when passing to, through or from curved track the only pivotal connection between the units permitting of the required relative lateral angular movement of the two units is at the axis of the universal joint. Therefore the front unit is called upon to exert great power to pull or swing the rear unit laterally. This places a great strain upon the conventional articulated link which causes undue wear and often fracture of the link and associated parts, and produces, as aforesaid, when reciting the objects of the invention, binding of the link and slippage, and also disturbs the proper distribution of the weight that is imposed upon the wheels of the units. Furthermore, for the above reasons, the conventional link and its associated parts require frequent replacement in whole or in part, and furthermore this mechanism, in comparison to the drawbars of the present invention, is relatively expensive.

It is the purpose of this invention to entirely eliminate the conventional articulated link and to employ instead drawbar means of any usual or preferred construction, but having only the capacity of transmitting tractive effort stresses, that is to say acting only as a tension member (or members if more than one drawbar are employed), thereby eliminating the objectionable features of the conventional articulated link.

The conventional articulated link of an articulated locomotive involving two power units is intended to push as well as to pull, and to withstand buffing and compressive stresses, but the drawbar of the present invention is neither relied upon nor adapted for such purposes, except for the purpose of pulling. To provide for withstanding such buffing, compressive and pushing stresses, in the present invention a buffer device is employed located between the adjacent ends of the two power units.

While the invention is not limited to any particular type of buffer device, it is preferable that it should have universal movement; also that it should control or partially eliminate vertical vibratory movements between the adjacent ends of the units; and also, what is of especial importance, that it should be capable of adjustment, or in any event be capable of cooperating with the drawbar or bars, so as to prevent any lost motion between the units during normal operation of the locomotive, such as would cause pounding or also detrimentally affect the valve movements.

In articulated locomotives where there are at least two power units articulated together, the valves of each unit employed for the distribution of steam to their respective power cylinders are controlled from the cab. Therefore where there is more or less longitudinal movement between the units during normal operation of the locomotive, this disturbs the desired fine adjustment of the valves, and it is a purpose of the present invention to prevent this by preventing any appreciable longitudinal movement between the units during normal operation in the manner aforesaid.

Referring to Figs. 1 and 2, a conventional type of articulated locomotive embodying the present invention is here shown more or less diagrammatically and a brief description thereof is all that is deemed necessary for an understanding of the present invention.

The locomotive is indicated generally by the reference numeral 1. For illustrative purposes only it is shown as a 4—6—6—4 type of locomotive comprising a front power unit, indicated generally by the reference numeral 2, and a rear power unit, indicated generally by the reference numeral 3. The front power unit comprises a frame 4, a four-wheel forward truck 5 flexibly connected with the frame 4 in a well-known manner, six driving wheels 6, and power cylinders 7.

The rear power unit comprises a frame 8, a four-wheel trailing truck 9 flexibly connected with the locomotive in a well-known manner, six driving wheels 10, power cylinders 11, a cylinder saddle 12, a boiler 13, and a cab 14. The boiler and cab are supported on the frame 8 by the supports 15 in the usual manner and also in the usual manner by the cylinder saddle 12. A relatively large portion of the boiler extends forward of the saddle 12, conveniently called an overhung portion, and this is supported on the frame 4 by a lateral motion resistance and centering device, indicated generally by the reference numeral 16, later to be described.

In Figs. 1 to 3, in place of the conventional articulated link, two drawbars 17 and 18, known as twin drawbars and of usual construction, are employed for connecting the two units. The drawbars are disposed symmetrically one at each side of the longitudinal vertical central plane of the locomotive.

The casting forming the cylinder saddle 12 is provided with a pocket 19, open at its front and at its bottom. A vertically cylindrical drawbar support 20 having a chamber 21 open at its front and registering with the front opening of the pocket 19, is disposed in the pocket, the pocket having cylindrical walls engaging the cylindrical walls of the drawbar support with a working fit, permitting the support to revolve about its vertical axis within the pocket. The support is inserted in the pocket through the open bottom and a plate 22 closes the open end affording a bottom support for the drawbar support 20, the plate 22 being in turn supported by the oppositely disposed flanges 23 forming a part of the casting of the saddle 12. The plate 22 is slid into place in the grooves 24, provided by the flanges 23 and the opposed walls of the pocket, and is secured in place in a well-known manner.

The twin drawbars 17 and 18 at their rear end portions extend through the front openings of the pocket 19 and support 20 into the chamber 21 and are pivotally connected to the upper and lower walls of the chamber 21 respectively by pins 25 and 26, the bars and the walls being orificed and the pins being inserted therethrough from the bottom, each being provided with a head 27 seating upon the plate 22. The orifices in the bars provide only a working fit with the pins permitting the bars to swing in a lateral direction. The bars seat, at the rear end portions, upon the lower wall of the chamber 21. The saddle is secured to the side frame members 28 of the frame 8 in a well-known manner (not shown).

A cross member 29, preferably in the form of a casting, is disposed between the rear end portions of the side frame members 30 of the frame 4, and is secured thereto in a well-known manner (not shown). This cross member is provided with a chamber 31, open at the rear. The front end portions of the twin bars extend through this rear opening into the chamber 31 and rest upon the bottom wall thereof. They are pivotally connected to the upper and lower walls of the chamber 31 respectively by pins 32 and 33, the bars and the walls being orificed and the pins being inserted therethrough from the bottom, each being provided with a head 34, supported each by a lock bolt 35 which is secured in lugs formed on the cross member 29.

The orifices in the bars at these forward end portions are formed as slots 36 extending lengthwise in a direction longitudinally of the bars. The pins bear against the forward walls of these slots during pulling forces exerted by either of the power units (depending upon the direction of travel of the locomotive). The slots are made sufficiently long to provide a clearance space 37 sufficient in extent to permit lost motion of the bars during all buffing and compressive stresses (later to be more fully described). The bars thus serve as pulling bars only, never as pushing bars, and when functioning are subjected only to a tension force, never to a buffing or compressive stress. The fit of the pins 32 and 33 with the side walls of their respective slots 36 provides for a sufficient degree of universal movement to permit corresponding relative movements between the power unit frames and also to this end if desired some play may be provided between the pins 25 and 26 and the side walls of the orifices in the support 20 through which these pins extend.

The pulling force of one unit upon another is transmitted from the cross member 29 to the cylinder saddle 12, or vice versa according to the direction of travel of the locomotive, and through the support 20, drawbars and pin connections thereof.

The twin type of drawbar has certain well-known features of advantage. It operates when the power units are angularly disposed to each other laterally, as when passing through curved track, by the two bars turning about the center of the cylindrical support 20. That is to say, the support slightly turns about its vertical axis to permit the bars to assume their new relative positions when passing through curved track.

As the bars are not intended for pushing, buffing or compressive stresses a buffing device is employed to take care of these stresses. In the present instance a well-known type of buffing device, indicated generally by the reference numeral 38, is shown in Figs. 2 to 5. Figs. 4 and 5 however show a different type of drawbar known as the safety drawbar, which will first be described. In this embodiment (Figs. 4 and 5) there is but one drawbar 39 employed (except in emergency), which is substantially similar to either of the drawbars 17 or 18 except that the rear end portion of the bar 39 is provided with a slot 40, although it is immaterial which end of this bar contains the slot.

The cylinder saddle 12' and the cross member 29' are each formed with two chambers 41—42 and 43—44 respectively. The chambers 41 and 42 are open at their forward ends and the chambers 43 and 44 are open at their rear ends. The drawbar 39 is disposed at its rear end portion in chamber 41 and at its front end portion in chamber 43. An emergency drawbar 45, termed a safety bar, is disposed at its rear end portion in chamber 42 and at its front end portion in chamber 44. The bar 39 rests upon the bottom walls of its chambers and the bar 45 likewise rests upon the bottom wall of its chambers. A pin 46 extends upwardly through orifices in the walls of the chambers 41 and 42, through the slot 40 in the bar 39, and through a slot 47 formed in the bar 45. A pin 48 extends upwardly through orifices in the walls of the chambers 43 and 44, through an orifice in the bar 39, with which it makes a working fit, and through a slot 49 formed in the bar 45. The pins 46 and 48 are secured in place similarly to the pins 32 and 33.

It will be noted that the clearance space provided by the slot 40 is in front of the pin 46 while the clearance spaces provided by the slots 47 and 49 are at the rear of their respective pins. Therefore it will be seen that the bar 45 is inoperative as a pulling bar unless the bar 39 should break or become inoperative, in which case then the bar 45 becomes the tension or pulling bar. The clearances in the slots of the bar 45 are sufficient to leave the bar free from the action of pushing, buffing and compressive stresses.

Referring to the buffing device 38, which is, as before remarked, of well-known construction, the cross member, whether of the type shown in Figs. 1 to 3 or that shown in Figs. 4 and 5, is provided with a housing 50 open at its rear end. In the front corners of the housing are oppositely disposed blocks 51 and 52. A chafing plate 53 is disposed in the rear part of the housing 50 and projects rearwardly from the rear opening therein. The block 51 and plate 53 have oppositely disposed vertical faces converging toward each other in a laterally outward direction, and similar faces, but oppositely disposed, are formed on the block 52 and the opposite portion of the plate 53. The plate 53 is provided with top and bottom extensions 54 and 55 respectively which fit between the top and bottom walls of the housing 50 in sliding engagement therewith. The extensions 54 and 55 are provided with slots 56, and a retaining pin 57 extends through these slots 56 and through aligned orifices in the top and bottom walls of the housing 50, thereby permitting the sliding movement of the plate 53 which is in a direction longitudinally of the locomotive.

A wedge 60 having vertical laterally outwardly converging faces is disposed between the top and bottom extensions 54 and 55 with its converging faces engaging the converging faces of the block 51 and the portion of the plate 53 opposite thereto. Another wedge 61 similar to the wedge 60 is disposed in a similar manner with its converging faces engaging the converging faces of the block 52 and the portion of the plate 53 opposite thereto. The wedges are thus permitted to slide laterally between the extension 54 at the top and the extension 55 at the bottom. The wedges 60 and 61 are formed hollow with open ends facing each other to provide a housing for a helical spring 62 which in the present instance is shown as formed in two abutting sections. The spring seats upon the opposite end walls of the housing and these walls are provided with orifices through which extends a bolt 63 which also extends through the center of the helical spring and which is provided at one end with a pair of nuts 64. By adjusting these nuts the spring may be brought to the proper tension. The end walls of the housing 50 are provided with openings (shown in Fig. 5) to facilitate the assemblage and adjustment of the bolt 63.

A chafing plate 65 is secured by bolts to the front of the cylinder saddle 12, as in Figs. 2 and 3, or 12' as in Figs. 4 and 5. This plate is provided at its top with a flange 66 from which a shoe 67 hangs. The shoe 67 and plate 65 have engaging rounding faces to permit relative movement between the shoe and plate. The shoe has a forward concave face 68 which engages a corresponding convex face 69 formed on the chafing plate 53.

The operation of this buffing device is well known and no further description of this is deemed necessary as the device, as before remarked, is of a conventional type. It should be remarked however that the device preferably fills the space between the adjacent ends of the power units and is of sufficient rigidity (or adjusted to afford sufficient rigidity) so that it will not appreciably yield as a buffing device under normal running conditions. The buffing device and the drawbar or bars will thus operate without permitting any fore and aft play between the power units under normal running conditions, thereby obtaining the beneficial results aforementioned. It should also be remarked that the amount of movement of the chafing plate 53 relative to the housing 50 is determined by the drawbar or bars as to outward movement of the chafing plate, and is determined as to inward movement thereof by the length of the spaces $a$ between the ends of the extensions 54 and 55 and the adjacent portions of the blocks 51 and 52. It is desirable that the limit of the buffing movement should be beyond the movement induced by the tractive power of the units.

Drawbars of usual construction commonly employed for connecting two separate railway vehicles have been illustrated for connecting the units of the articulated locomotives, in place of the usual articulated link employed for such purpose, for the reason that these drawbars well carry out the features of the invention. These drawbars are provided with the aforesaid slot for the connecting pin at one end, or they may be slotted in some instances at both ends if desired. The slot relieves the bars of all pushing, buffing and compressive stresses, the bars being merely tension or pulling bars. The invention however contemplates the employment of pulling or tension means of other constructions. For instance such means may be in the form of a composite bar where the sections of the bar are connected together by a slip joint to provide for pulling but no buffing stresses, and in fact a chain, cable, or other flexible means can be employed. But, as above stated, the conventional drawbar is deemed preferable.

It will be noted that in any instance the connection for the units permits free lateral movement of each unit at their adjacent end portions independently of the other unit which is not possible when employing the articulated link commonly used for connecting the units of an articulated locomotive.

The engaging faces 68 and 69 provided on the shoe 67 and plate 53 are curved transversely. They are of similar curvature and of a radius permitting free sliding movement therebetween in a lateral direction when the units move relative to each other laterally to assume angular positions as when passing through curved track. These engaging surfaces are straight vertically to provide for the slight relative vertical movement between the adjacent ends of the units which may take place when the locomotive is in motion. Also when occasion arises the shoe 67 slides laterally upon the chafing plate 65. The lateral curvature of the engaging faces of the shoe 67 and plate 65 is that of a circle having its center approximately at the axis of rotation of the connecting means (drawbar or other means) with the rear unit 3, and the aforementioned center of the curved faces 68 and 69 is normally approximately on the axis of rotation of the connecting means with the front unit 2. The drawbars freely permit all such movements between the chafing plate 65, shoe 67 and chafing plate 53.

Referring to Figs. 6 to 8, a different type of drawbar is employed and a different type of buffing device is also employed. The buffing device previously described is of the friction type while the buffing device of Figs. 6 to 8 employs only springs with no friction elements. However these buffing devices in the various embodiments illustrated may be substituted one for the other and in fact any suitable type of buffing device may be employed.

The drawbar 70 is of the single drawbar type. Its forward end extends into a chamber 31' forming part of the casting of the cross member 29" and is secured therein by a pin 71 which passes through orifices in the bar and the upper and lower walls of the chamber. The rear end of the bar extends into a chamber 72 formed in the casting of the cylinder saddle 12" and is secured therein by a pin 73 which passes through a slot 74 and through bushings 75 and 76 secured in the upper and lower walls respectively of the chamber 72. This bar 70 is comparable with the bar 39 and remarks made in connection with the bar 39 apply equally here. The forward end portion of the bar 70 rests upon a raised portion of the lower wall of the chamber 31' and the rear end portion rests upon the bushing 76. The pins are secured in place in a manner similar to the pins 46 and 48.

The buffing device, indicated generally by the reference numeral 77, comprises a chafing plate 78 which engages a shoe 79 which in turn engages a chafing plate 65, all in a manner similar to the frictional buffing device already described, except that the chafing plate 65 is shown integral with the casting of the cylinder saddle 12". The cross member 29" is provided with a housing 80 open at its rear end. The chafing plate 78 extends into this housing with walls thereof being adjacent to opposite walls of the housing to permit the necessary sliding movement between the chafing plate and the housing. The chafing plate 78 is provided with two chambers 81, one at each side of the longitudinal vertical central plane of the locomotive, each of which houses a horizontally disposed helical compression spring 82. The springs are disposed between opposite walls of the housing 80 and plate 78 to take the pushing, buffing and compressive stresses.

The plate 78 is provided at each side thereof with a flange 83. Each flange is secured to, but in normally spaced relation from a wall 84 forming part of the casting of the cross member 29", by means of studs 85 provided with nuts 86 which provide for adjustment and which retain the chafing plate 78 in place while permitting it to slide. Except for the differences in operation of the springs of the buffing device 77 and the friction means of the buffing device 38 their operations are similar. The outward limit of movement of the spring buffing device 77 is determined by the drawbar 70 and the inward limit of movement is determined by the space b between the front end of the chafing plate 78 and the adjacent wall of the housing 80.

The lateral motion resistance and centering device 16 is disposed between the overhung portion of the boiler 13 and the frame 4 of the forward unit 2. This device offers a predetermined yielding resistance to any relative lateral movement between the boiler at its overhung portion and the unit 2. It also assists in bringing these two parts of the locomotive into their normal so-called central positions after any such lateral displacing movement which is most manifest when the locomotive is passing through curved track.

The detailed construction of this device 16 is shown principally in Figs. 9 to 15. At this location of the device the unit 2 is provided with a cross member 87 which is secured to the side members 30 of the frame of the unit 2 in the usual manner, and may be used for various other purposes, mainly for supporting the engine crosshead guides (not shown). Above this cross member is a boiler saddle 88 secured to the boiler 13 in the usual manner. At each side of the longitudinal vertical central plane of the locomotive is disposed a lateral motion resistance and centering device unit, indicated generally by the reference numeral 89. Each unit 89 is similar and a description of one will therefore suffice, namely the one shown at the left in Fig. 9.

It will be noted that when the front unit 2 swings laterally relative to the rear unit 3 this movement is about a center in the proximity of the drawbar means. For instance in the embodiment shown in Figs. 1 to 3 it is at or near the axis of the drawbar support 20 located on the rear unit 3. Therefore the lateral movement between the front unit 2 and the overhung portion of the boiler is arcuate in direction and, on sharp curves especially, the extent of movement is very pronounced. For this reason the two lateral motion resistance and centering device units 89 are preferably set at an appropriate angle to each other depending upon the length of the radius of the swinging movement just referred to. Their angular positions are best shown in Figs. 2 and 10. They maintain these angular positions relative to each other and to the boiler saddle 88, but not relative to the cross member 87 which changes its angular position relative to these units 89 and to the boiler saddle as will later more fully appear.

The cross member 87 is provided with a top wall or plate 90 extending transversely entirely across the locomotive. A plate 91 rests upon the plate 90 and is provided with a transversely rounding bottom face 92 to permit the plate 91 to rock relative to the plate 90 whenever there is a fore and aft tilting movement between the front unit 2 and the rear unit 3, that is to say between the front unit 2 and the overhung portion of the boiler. In such tilting movements the plate 91 rocks with the overhung portion of the boiler in order that its relation therewith will not be disturbed. This rocking movement is relatively slight but occurs in service principally due to track irregularities. The plate 91 has no other movement relative to the plate 90 and to this end it is secured to the plate 90 at its opposite end portions centrally of these portions by dowels 93 which however provide sufficient play to permit the aforesaid rocking movement. The plate 91 extends substantially entirely across the locomotive and affords a support for each of the lateral motion resistance and centering device units 89.

This unit 89 (describing only one as the two are similiar) comprises a bottom roller seat 94 and a top roller seat 95, oppositely disposed to each other when in normal position and set at an angle to the longitudinal vertical central plane of the locomotive as aforesaid. Except for their angularity as aforesaid they extend in a direction transversely of the locomotive. At the opposite sides of their transverse vertical central plane they are provided with oppositely disposed faces diverging toward this plane. A right-angularly-shaped member 96 is disposed at each forward and rear side of these seats, forming in effect extensions of these seats, the horizontal legs of these members being respectively welded to the adjacent side of the seat and the vertical legs of each oppositely disposed pair of these members being directed toward, but spaced from, each other. The seats and the members 96 are appropriately proportioned to provide in each instance a groove extending transversely of the locomotive (except for the angularity as aforesaid). A rack 97 is disposed in each of these grooves, preferably cast as part of the member 96, forming pairs of racks at the forward and rear sides of the seats, the teeth of the racks of each pair facing each other and having a diverging inclination similar to the seats. A roller 98 is disposed between the seats and is provided at each end with a gear wheel 99, each gear wheel being in mesh with the pair of racks adjacent thereto.

The roller in the present instance is formed of two bored sections 100, and a pin 101 is disposed in the bores of the sections with a working fit to maintain axial alignment of the sections but to permit each to rotate with its gear wheel independently of the other. The roller engages at its opposite ends the pair of vertical legs of the adjacent members 96 with a working fit, thereby preventing axial movement of the roller, or of either section thereof. The bottom roller seat moves with the front unit 2 and the top roller seat moves with the overhung portion of the boiler during relative lateral movement between these parts of the locomotive.

The roller rolls up the inclined seat faces from its central position (against the imposed weight of the overhung portion of the boiler) to afford resistance to all such lateral displacement movement and is urged to roll down the seat faces toward its central position due to the aforesaid imposed weight, thereby assisting in returning the parts to central position which takes place when the roller is at its central position. This is all in accordance with common practice.

Toward the accomplishment of these movements of the seats the saddle 88 is provided at each end with a wall or plate 102 for each device unit. The top seat 95 engages at its upper face the lower face of the adjacent plate 102 and is provided with a centrally located upwardly projecting dowel 103. The dowel is disposed in an orifice formed in the plate 102 over which is a plate 104 to which the top seat is secured by a screw 105. The top seat is thus held in place against any movement except rotative movement, and this is prevented in a manner presently to be described. However, any appropriate means may be provided for securing the top seat in place, but the means described has the advantage of flexibility, insuring proper alignment of the top seat in its desired angular positions.

The bottom roller seat 94 is secured differently. The plate 91 is provided with a rectangular opening 106 centrally disposed as to the bottom seat when in normal position. A block 107 is disposed in this opening with its lateral sides 108 providing a working sliding fit with the adjacent sides of the opening. The front and rear sides 109 of the block are normally spaced from the respective front and rear sides of the opening thereby permitting the block to have a slight movement in the opening in a direction generally longitudinally of the locomotive. The opening is provided near its bottom with a closure plate 110 welded to the sides of the opening providing a means for retaining a lubricant. The bottom roller seat at its lower face engages the upper face of the plate 91 and is supported by this plate. An orifice 111 is formed in the block 107 and a dowel 112, projecting from the lower face of the bottom roller seat 94, has a working fit within this orifice.

The saddle 88 is provided with downwardly projecting flanges 113, one at the forward side and another at the rear side of the device unit 89. These flanges extend down to overlap the adjacent front and rear sides of the bottom roller seat 94. These flanges prevent the top roller seat from turning about the axis of the dowel 103 and the bottom roller seat from turning relative to the top roller seat and from getting out of alignment therewith during the relative movement of the seats as aforedescribed. During this relative movement the bottom roller seat moves with the front unit 2 and as these movements are angular movements as regards the two units 2 and 3, that is to say swinging movements, the bottom roller seat, being confined by the flanges 113, rotates about the axis of the dowel 112 relative to the front unit 2 and is guided in this rotation and in its movement transversely of the locomotive relative to the top seat by the engaging pair of flanges 113 through which flanges the bottom seat moves. As this later movement is sometimes quite pronounced and in order therefore to maintain a sufficient sliding engagement between the bottom seat and the flanges 113, the bottom seat is provided with an inwardly extending portion 114 which has front and rear sides which respectively engage the adjacent flange 113.

The flanges 113 have, at their lower portions, outwardly extending flanges 115. On the cross member 87 are secured three hook-shaped members 116 having inwardly extending lugs 117. Two of these members 116 are secured at the front side of the cross member 87 near the opposite ends thereof with their lugs 117 disposed above and spaced from the adjacent flange 115. The third member 116 is secured at the rear side of the cross member 87 midway between its ends with its lug 117 disposed above and spaced from the adjacent flange 115. These spaces are sufficient in extent to allow all permissible relative movement between the front unit 2 and the overhung portion of the boiler but on the other hand prevent accidental separation as by excessive vertical relative movement of the cross member 87 and the saddle 88, one from the other. The positioning of the members 116, two at the front and one at the rear as aforesaid, permits the relative swinging lateral movement between the front unit 2 and the boiler.

During swinging lateral movement between the units 2 and 3 and especially during pushing, buffing and compressive forces exerted by one power unit upon the other and the release of such forces, the two units 2 and 3 have a certain amount of relative movement in a direction longitudinally of the locomotive and accordingly the cross member 87 and saddle 88 have corresponding movement. However the bottom roller seat, which has movement transversely with the cross member 87, is held at all times between the oppositely disposed flanges 113 and therefore must move with the saddle 88 during this relative longitudinal movement between the cross member 87 and the saddle 88, and also during whatever slight longitudinal movement there may be, due to temperature changes, of the front end of the boiler forward of the saddle 12. The spaces between the sides 109 of the block 107 and the adjacent sides of the opening 106 permit of these relative longitudinal movements without disturbing the proper alignment of the roller seats. During these relative longitudinal movements these spaces permit the blocks 107 to slide in a fore and aft direction in their respective openings 106 and accordingly the proper functioning of the lateral motion resistance and centering device is maintained during all such relative movements.

While the lateral motion resistance and centering device units are set at an angle suitable to facilitate their proper operations during the relative angular transverse movements between the locomotive units, nevertheless the relative lateral movements between the top and bottom roller seats of each device unit 89 are along straight lines as this has been found to give satisfactory results, and has the advantage of materially simplifying the manufacture of the lateral motion resistance and centering device.

Referring to Figs. 16 to 18, wherein is shown a modification, a locomotive is chosen, for convenience, similar to the locomotive already described. Therefore no description thereof will here be necessary. Similar parts, however, are indicated by similar reference numerals.

While the drawbar is here shown of the type similar to that of Figs. 4 and 5, it will be understood that any of the drawbars previously described may be employed, and that the draft gear may be modified accordingly as previously described.

As previously described the drawbars have a universal connection at each end thereof with their respective power units. Accordingly the rear unit lacks the steadying effect on the rear end of the frame of the front unit against lateral movement relative to the boiler, which steadying effect is present where the conventional type of articulated connection is employed. To compensate for this in the present modified construction a second (rear) boiler support of the lateral motion resistance and centering device type, located toward the rear end of the front power unit and carried by the frame thereof, is employed. This second device not only resists lateral movement of the frame at its rear end portion but further, cooperates with the front device to yieldingly resist bodily lateral movement of the frame or lateral movement at any part thereof, each device functioning, when required, to urge the return of the laterally moved frame to its normal central position.

Furthermore the two devices being carried by the frame and supporting the overhung portion of the boiler at two widely separate points, serve to prevent the supporting frame, that is to say the frame of the front unit, from tilting or oscillating in a vertical plane longitudinally of the locomotive. The oscillating or tilting is more likely to occur when the draft gear is subjected to buffing, pushing or compressive stresses, at which time the drawbar (or bars) is free from tension, the drawbar, when under tension, as in pulling, having some resisting effect upon the oscillating or tilting of the rear end of the frame of the front unit.

The front lateral motion resistance and centering device mechanism is indicated generally by the reference numeral 118. This mechanism is similar to that already described and accordingly the parts thereof are indicated by similar reference numerals. The device however, as indicated in Fig. 16, is moved further forward to a position under the smokebox instead of being located under the forward end of the boiler proper, as shown in Fig. 1.

As the bottom of the smokebox is somewhat raised from the bottom of the boiler proper, and of different shape, a somewhat differently constructed boiler saddle 88" is provided including a lowering of the wall or plate 102", as a comparison of the saddle shown in Fig. 18 at the right and that of Fig. 9 will show. As the detailed construction of this feature forms no part of the present invention, further description is deemed not necessary.

The rear lateral motion resistance and centering device mechanism, indicated generally by the reference numeral 119, is similar in the main to the mechanism 118. Therefore similar parts will be indicated by similar reference numerals with accents added. The mechanism 119 is made shorter, and the roller seats are correspondingly shortened, as the swinging movement of the front unit is not as great at the location of the rear mechanism as at the location of the front mechanism, and the lateral travel of the rear seats is correspondingly shortened.

The rear mechanism is considerably spaced rearwardly from the front mechanism and as it is beneath the boiler proper, the saddle 88' and associated parts are similar to the saddle 88 but the wall or plate 102' is somewhat shorter than the wall or plate 102.

The front mechanism 118 comprises three hook-shaped members 116" (see Fig. 17) similar to the hook-shaped members 116 of the construction shown in Fig. 12 except in Fig. 17 the front hook-shaped members are somewhat lengthened to provide for the greater swing of the boiler at this location. The rear mechanism 119 comprises similar hook-shaped members 116'. Only two are used, one at the rear and one at the front. One hook-shaped member 116' at the front is sufficient at this location on account of the relatively short swing of the frame at this location.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. An articulated steam locomotive comprising a boiler; a forward power truck unit supporting a portion of the weight of said boiler and movable relative thereto in a longitudinal direction; a rear power truck unit adjacent said forward unit supporting another portion of the weight of said boiler and having a rigid connection therewith, said units being articulated together at their adjacent end portions; pulling means connecting said units together at their adjacent end portions for said articulation thereof, including a drawbar and vertical pivotal connections connecting the opposite ends of said bar, each with the adjacent unit end portion whereby said bar can swing laterally, about said pivotal connections, relative to each unit end portion and each said unit end portion can move laterally about its pivotal connection independently of the other said unit end portion; a buffing device disposed between and operably engaging said unit end portions yieldingly resisting pushing, buffing and compressive forces, within a predetermined range, transmitted thereto by either of said units thereby permitting relative longitudinal movement between said units, and between said boiler and said forward unit, said bar being provided with means rendering it inoperative and free from said forces during the operation of said device whereby said bar is subject to pulling forces only; a lateral motion resistance and centering device disposed between a portion of said boiler and a portion of said forward unit comprising upper roller seat means having connection with said boiler portion, lower roller seat means having connection with said forward unit portion, and means for maintaining vertical alignment of both said roller seat means, one of said seat means connections being rigid and the other of said seat means connections permitting relative movement between the roller seat means and portion connected thereby in a direction longitudinally of said locomotive during said relative longitudinal movement between said boiler and said forward unit and between said units; and roller means disposed between said seat means.

2. An articulated steam locomotive comprising a boiler; a forward boiler-supporting power truck unit; a rear power truck unit, adjacent said forward unit, supporting a part of the weight of said boiler and having a rigid connection therewith, said units being articulated together at their adjacent end portions; pulling means connecting said units together at their adjacent end portions for said articulation thereof, including a drawbar and vertical pivotal connections connecting the opposite ends of said bar, each with the adjacent unit end portion whereby said bar can swing laterally, about said pivotal connections, relative to each unit end portion and each said unit end portion can move laterally about its pivotal connection independently of the other said unit end portion; a buffing device disposed between and operably engaging said unit end portions yieldingly resisting pushing, buffing and compressive forces, within a predetermined range, transmitted thereto by either of said units thereby permitting relative longitudinal movement between said units, and between said boiler and said forward unit, said bar being provided with means rendering it inoperative and free from said forces during the operation of said device whereby said bar is subject to pulling forces only; two longitudinally spaced lateral motion resistance and centering devices, each disposed between a separate portion of said boiler and an opposite portion of said forward unit, each comprising upper roller seat means having connection with the portion of said boiler adjacent thereto, lower roller seat means having connection with the portion of said forward unit adjacent thereto, and means for maintaining vertical alignment of both said roller seat means, one of said seat means connections being rigid and the other of said seat means connections permitting relative movement between the roller seat means and portion connected thereby in a direction longitudinally of said locomotive during said relative longitudinal movement between said boiler and said forward unit and between said units; and roller means disposed between said seat means.

3. An articulated steam locomotive comprising a boiler; a rear steam-propelled power truck unit supporting the rear portion of said boiler and rigidly connected therewith at a part thereof, said boiler having its front portion extending forwardly beyond said unit; a forward steam-propelled power truck unit disposed adjacent said rear unit beneath said boiler front portion and free from said boiler front portion for bodily horizontal movements laterally and longitudinally relative to said rear unit and said boiler front portion; a lateral motion resistance and centering device supporting said boiler front portion upon said forward unit between the ends thereof having coacting parts adapted for limited horizontal movements laterally and longitudinally therebetween, one part being connected to said forward truck unit and the other part being connected to said boiler front portion, leaving said forward unit free from said boiler front portion for said bodily horizontal movement but limiting said bodily horizontal movement and leaving said forward unit free to swing laterally relative to said boiler front portion; a buffing device operatively engaging the adjacent ends of said units for yieldingly resisting buffing forces beyond a predetermined magnitude transmitted by said units; and pulling means connecting said units together at said adjacent ends for articulation thereof, including a drawbar having orifices at its opposite ends and pivot pins engaging said orifices connecting said opposite ends of said drawbar, each for universal movement with the adjacent unit end portion whereby said drawbar can swing laterally about said pivot pins relative to each said unit end portion and each said unit end portion can move laterally about its pivotal connection independent of the other said unit end portion, said drawbar having one of its said orifices longitudinally elongated, rendering said drawbar free from said buffing forces, whereby said drawbar is subject to pulling forces only.

JAMES G. BLUNT.